(12) United States Patent
Heminway (10) Patent No.: US 7,686,245 B2
(45) Date of Patent: Mar. 30, 2010

(54) ROTARY AIRCRAFT DOWNLOAD ALLEVIATION APPARATUS AND METHODS

(75) Inventor: Robert C. Heminway, Pennsauken, NJ (US)

(73) Assignee: The Boeing Company, Chicago, IL (US)

(*) Notice: Subject to any disclaimer, the term of this patent is extended or adjusted under 35 U.S.C. 154(b) by 880 days.

(21) Appl. No.: 11/469,839

(22) Filed: Sep. 1, 2006

(65) Prior Publication Data

US 2009/0236467 A1    Sep. 24, 2009

(51) Int. Cl.
*B64C 27/00* (2006.01)
*B64C 1/38* (2006.01)

(52) U.S. Cl. ............. 244/17.11; 244/17.23; 244/130; 244/135 B (58) Field of Classification Search .......... 244/17.19, 244/17.23, 17.11, 130, 46, 99.1, 99.12, 135 A, 244/135 B
See application file for complete search history.

(56) References Cited

U.S. PATENT DOCUMENTS

| | | | | |
|---|---|---|---|---|
| 3,544,047 A | * | 12/1970 | Gabriel | 244/17.11 |
| 4,786,009 A | * | 11/1988 | Rao et al. | 244/99.1 |
| 4,860,972 A | * | 8/1989 | Lannerd et al. | 244/135 R |
| 2004/0245377 A1 | * | 12/2004 | Shiraishi et al. | 244/17.11 |

FOREIGN PATENT DOCUMENTS

JP        07047998 A   *  2/1995

OTHER PUBLICATIONS

MetroBooks, Modern Military Aircraft Anatomy, 2002, Michael Friedman Publishing Group, Inc., 148-149.*

* cited by examiner

*Primary Examiner*—Michael R Mansen
*Assistant Examiner*—Joshua J Michener
(74) *Attorney, Agent, or Firm*—Lee & Hayes, PLLC (57) ABSTRACT

Apparatus and methods for alleviating rotary aircraft downloads are disclosed. In one embodiment, a rotary aircraft includes an airframe assembly having a fuselage, at least one rotor assembly operatively coupled to the airframe assembly and configured to provide a downwash over at least a portion of the airframe assembly during operation of the at least one rotor assembly, and at least one download alleviation strake operatively coupled to the fuselage, each download alleviation strake extending at least partially along a length of the fuselage and being configured to reduce a downwash download during operation of the at least one rotor assembly. In some embodiments, the airframe assembly includes at least one fuel tank, and the at least one download alleviation strake is coupled to the at least one fuel tank. The download alleviation strake may be pivotably coupled to the at least one fuel tank.

7 Claims, 6 Drawing Sheets

ROTARY AIRCRAFT DOWNLOAD ALLEVIATION APPARATUS AND METHODS

FIELD OF THE INVENTION

This invention relates generally to download alleviation apparatus and methods for rotary aircraft, including, for example, helicopters equipped with pannier-style fuel tanks and the like.

BACKGROUND OF THE INVENTION

Modern rotary aircraft are widely recognized as providing great versatility and unique capabilities in both military and civilian applications. Favored for their ability to take off and land without runways, and for their ability to hover, maneuver, and perform missions unachievable by other types of aircraft, rotary aircraft represent a vital component of a modern military arsenal. Similarly, rotary aircraft have become an integral part of the efficient operations in many civilian environments, including transportation of employees and equipment into remote locations, reporting activities by television and radio broadcasting companies, emergency medical transportation services, and law enforcement activities by civilian authorities.

Although desirable results have been achieved using prior art rotary aircraft, there is room for improvement. For example, for some applications, it may be desirable to attach auxiliary fuel tanks to a rotary aircraft, such as a helicopter, in order to increase its range or time aloft. In one particular example, a Boeing CH-47 Chinook helicopter may have pannier-style fuel tanks attached to each side of its fuselage to increase the helicopter's range. Typically, since the overall height of the tank is limited by other considerations, the overall width of the combination of fuselage and auxiliary tanks is significantly increased to achieve the desired capacity. Consequently, due to increased flowfield interactions between the rotor downwash and the combination of fuselage and auxiliary tanks, the aerodynamic downloads are increased, and the maximum hover takeoff gross weight, and hence payload capability, is reduced. Efforts directed toward reshaping the tanks to achieve a reduced vertical drag coefficient have been only marginally successful. Therefore, novel systems and methods that more successfully mitigate these download effects would have utility.

SUMMARY OF THE INVENTION

The present invention is directed to rotary aircraft download alleviation apparatus and methods. Embodiments of the invention may advantageously reduce download drag during operation of rotary aircraft, thereby improving the payload capacity, range, time aloft, and overall mission performance capabilities in comparison with the prior art.

In one embodiment, a rotary aircraft comprises an airframe assembly including a fuselage, at least one rotor assembly operatively coupled to the airframe assembly and configured to provide a downwash over at least a portion of the airframe assembly during operation of the at least one rotor assembly, and at least one download alleviation strake operatively coupled to the fuselage, each download alleviation strake extending at least partially along a length of the fuselage and being configured to reduce a downwash download during operation of the at least one rotor assembly. In some embodiments, the airframe assembly includes at least one fuel tank, and the at least one download alleviation strake is coupled to the at least one fuel tank. The download alleviation strake may be pivotably coupled to the at least one fuel tank and may be controllably moveable over a range of deflection angles. In further embodiments, the download alleviation strake is contoured to at least partially conform to an adjacent lower surface portion of the fuel tank.

In another embodiment, an assembly for providing auxiliary fuel capacity for a rotary aircraft having a fuselage includes at least one fuel tank, and at least one download alleviation strake coupled to the at least one fuel tank. The at least one fuel tank is configured to be operatively coupled to the rotary aircraft such that at least a portion of the at least one fuel tank extends laterally outwardly beyond a plan view perimeter of a fuselage. The at least one download alleviation strake is operatively coupled to the at least one fuel tank, and extends at least partially along a length of the at least one fuel tank and being configured to reduce a downwash download during operation of the rotary aircraft.

In a further embodiment, a method of operating a rotary aircraft includes providing at least one download alleviation strake operatively coupled to a fuselage portion of the rotary aircraft, rotating at least one rotor assembly of the rotary aircraft to produce a downwash over the fuselage portion; and positioning the at least one download alleviation strake to at least partially reduce a download on the fuselage portion of the rotary aircraft due to the downwash. In one particular embodiment, providing at least one download alleviation strake operatively coupled to a fuselage portion includes providing a plurality of download alleviation strakes operatively coupled to a fuselage portion. Alternately, providing at least one download alleviation strake includes providing at least one download alleviation strake operatively coupled to the fuselage portion via a fuel tank; and wherein positioning the at least one download alleviation strake to at least partially reduce a download includes positioning the at least one download alleviation strake to at least partially reduce a download on at least one of the fuselage portion and the fuel tank of the rotary aircraft due to the downwash.

BRIEF DESCRIPTION OF THE DRAWINGS

Embodiments of the present invention are described in detail below with reference to the following drawings.

DETAILED DESCRIPTION

The present invention relates to rotary aircraft download alleviation apparatus and methods. Many specific details of certain embodiments of the invention are set forth in the following description and in FIGS. 1-10 to provide a thorough understanding of such embodiments. One skilled in the art, however, will understand that the present invention may have additional embodiments, or that the present invention may be practiced without several of the details described in the following description.

In general, embodiments of rotary aircraft download alleviation systems and methods in accordance with the present invention may substantially reduce the downloads on the airframe assembly, thereby improving the rotary aircraft's performance (e.g range), with less penalty in gross vehicle takeoff weight (and payload), in comparison with the prior art. Furthermore, performance improvements that may be achieved using embodiments of the invention may increase takeoff or hover capabilities and flight characteristics at higher altitude and within higher temperature environments.

Figure 1:
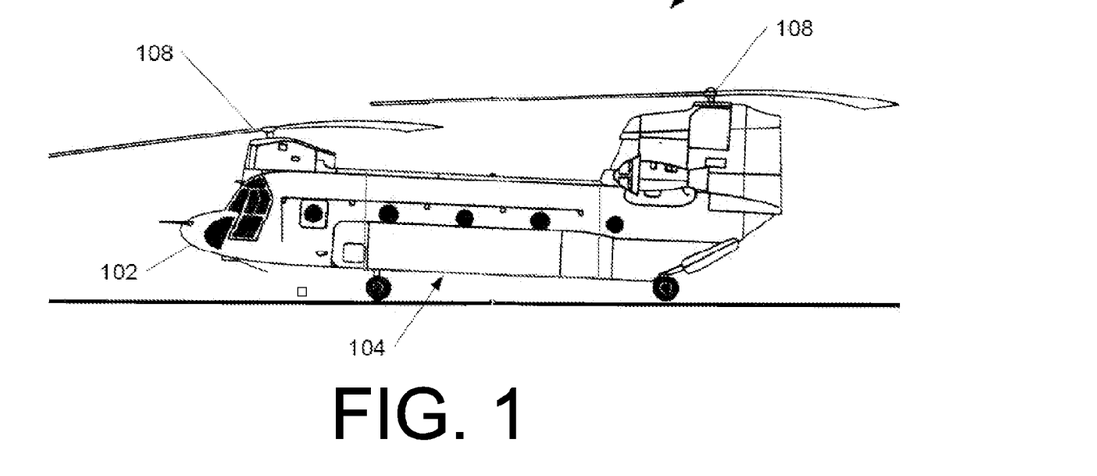
FIG. 1 is a side view of a helicopter equipped with auxiliary fuel tanks having download alleviation devices in accordance with an embodiment of the invention.
Figure 2:
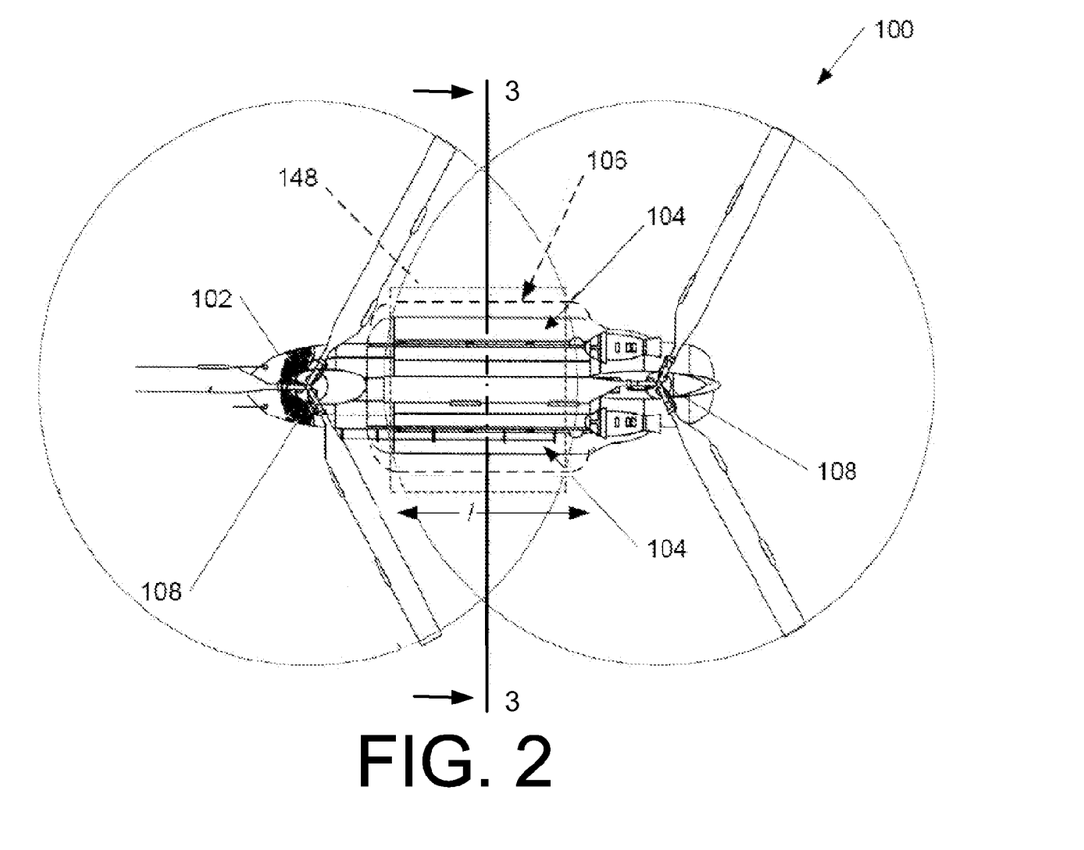
FIG. 2 is a plan view of the helicopter of FIG. 1.

FIG. 1 is a side view of a helicopter 100 in accordance with an embodiment of the invention. FIG. 2 is a plan view of the helicopter 100 of FIG. 1. In this embodiment, the helicopter 100 includes a fuselage 102, and a pair of auxiliary fuel tanks 104 coupled to lateral sides of the fuselage 102. The helicopter 100 also includes a pair of rotor assemblies 108 that provide lift and forward thrust during flight in the conventional manner.

As best shown in FIG. 2, the auxiliary fuel tanks 104 project laterally outwardly beyond a plan view perimeter of the fuselage 102. It should be noted that different fuel tank configurations may project laterally outwardly by differing amounts. For example, in the embodiment shown in FIG. 2, the auxiliary fuel tanks 104 may represent a set of pannier-style fuel tanks commonly used on a CH-47 Chinook helicopter. For comparison purposes, an outline of alternate fuel tanks 106 (shown in dashed lines) representing those commonly associated with the MH-47 helicopter are also shown in FIG. 2.

It will be appreciated that the invention is not limited to use with the particular helicopter embodiment shown in FIGS. 1 and 2. For example, in alternate embodiments of the invention, download alleviation devices may be used on helicopters having only a single rotor assembly, or helicopters without fuel tanks located on lateral sides. Furthermore, the invention is not limited to use with helicopters. For example, in alternate embodiments, download alleviation devices in accordance with the present invention may be used on a wide variety of rotary aircraft, including rotary-powered Unmanned Aerial Vehicles (UAV's) such as the A160 Hummingbird UAV, or tilt-rotor aircraft such as the Boeing V-22 Osprey, or any other suitable type of rotary aircraft.

Figure 3:
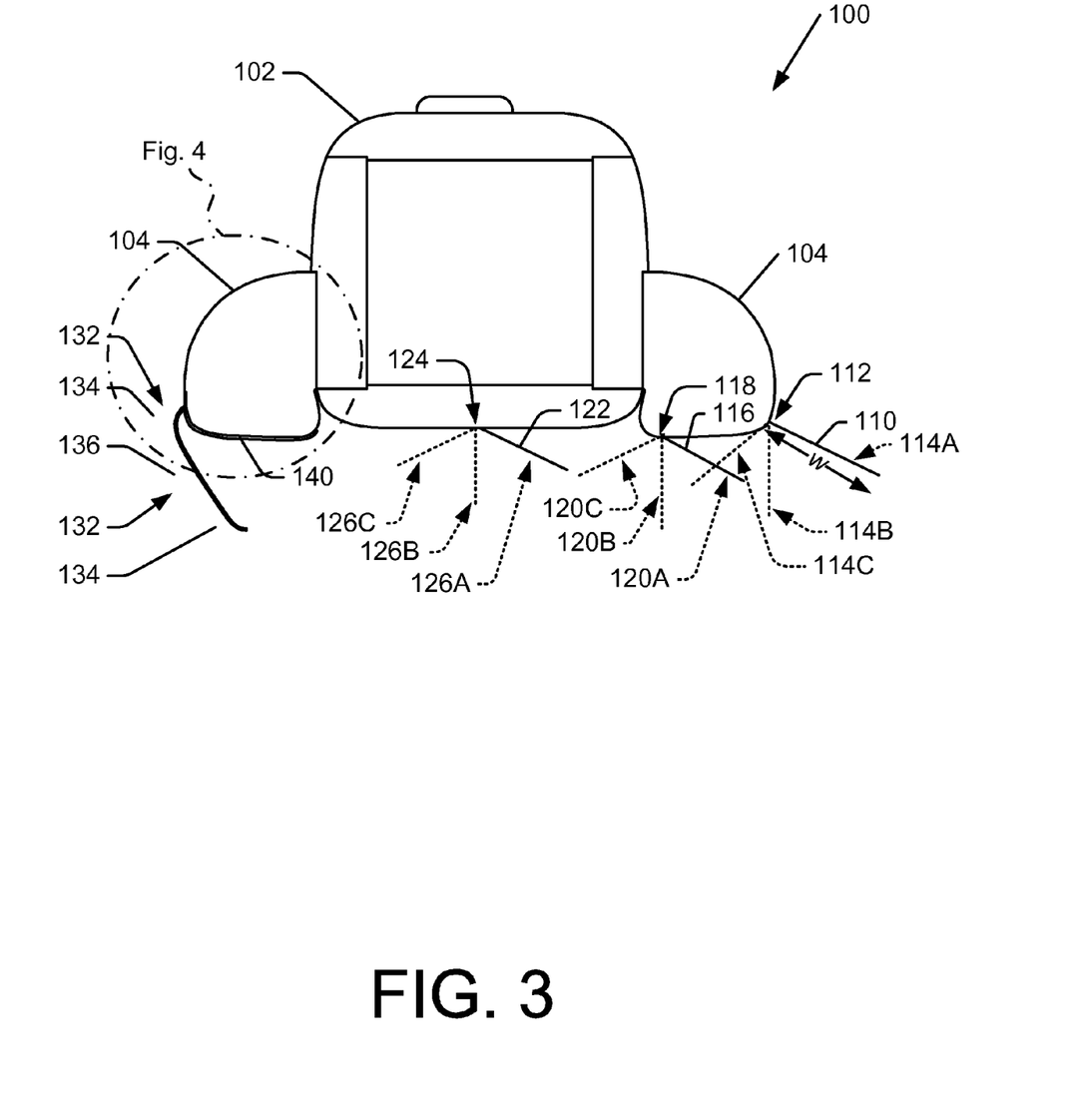
FIG. 3 is an enlarged cross-sectional view of a contoured strake of the helicopter of FIG. 1 in accordance with a further embodiment of the invention.

FIG. 3 is a cross sectional view of a mid-fuselage portion of the helicopter 100 of FIG. 1. In this embodiment, the helicopter 100 includes a first strake (or download alleviation device) 110 pivotably coupled along an outboard portion 112 of the right-side auxiliary fuel tank 104. As used herein, the term strake is used to refer to control air flow, such as by alternating a pressure distribution. The first strake 110 of one embodiment has an aerodynamic surface which is generally planar and has a width w and a length that approximately corresponds to a length l of a cylindrical body portion (FIG. 2) of the auxiliary fuel tank 104. As shown in FIG. 3, the first strake 110 may be controllably pivoted from an outwardly deployed position 114A, a vertically deployed position 114B, and an inwardly deployed position 114C. An actuator mechanism (not shown) is provided to selectively pivot the strake between various positions. A strake may be pivoted while the aircraft is in flight to improve performance at various flight conditions. In one particular embodiment, the outwardly deployed position 114A and the inwardly deployed position 114C are approximately 25 degrees below horizontal. Of course, in alternate embodiments, any suitable angular positions may be utilized. The strake may have a variety of shapes, sizes, and/or configurations without departing from the scope of this invention. It may be at a fixed position relative to the helicopter or fuel tank (avoiding a pivotal connection) and may extend integrally therefrom. Alternatively, the strake may be mounted so as to be moveable in translation such as to telescope from the helicopter or fuel tank.

As further shown in FIG. 3, the attachment location of the first strake 110 is not limited to the outboard portion 112 of the auxiliary fuel tank 104. For example, a second strake 116 is pivotably coupled along an inboard portion 118 of the fuel tank 104, and is pivotable between outwardly deployed, vertically deployed, and inwardly deployed positions 120A, 120B, 120C. Similarly, a third strake 122 is pivotably coupled at a centerline portion 124 of the fuselage 102, and is pivotable between first, second (vertical), and third positions 126A, 126B, 126C. It will be appreciated that the first, second, and third strakes 110, 116, 122 may alternately be used individually or in any desired combination. Of course, in further embodiments, a greater number of strakes may be employed. Furthermore, although only one of the first and second strakes 110, 116 is shown attached to the right-side auxiliary fuel tank 104 in FIG. 3, it is understood that for symmetry considerations, a corresponding "mirror image" strake would typically be coupled to the left-side auxiliary fuel tank 104.

In another embodiment, a contoured strake 130 may be pivotably coupled to an outboard portion 132 of the auxiliary fuel tank 104 (see left-side fuel tank 104 of FIG. 3). In this embodiment, the contoured strake 130 includes a first arcuate portion 134, a relatively planar portion 136, and a second arcuate portion 138. The contoured strake 130 is configured to at least partially conform to an adjacent lower surface 140 of the auxiliary fuel tank 104. One advantage of the contoured strake 130 is minimal frontal area and corresponding aerodynamic drag during forward flight of the helicopter.

Figure 4:
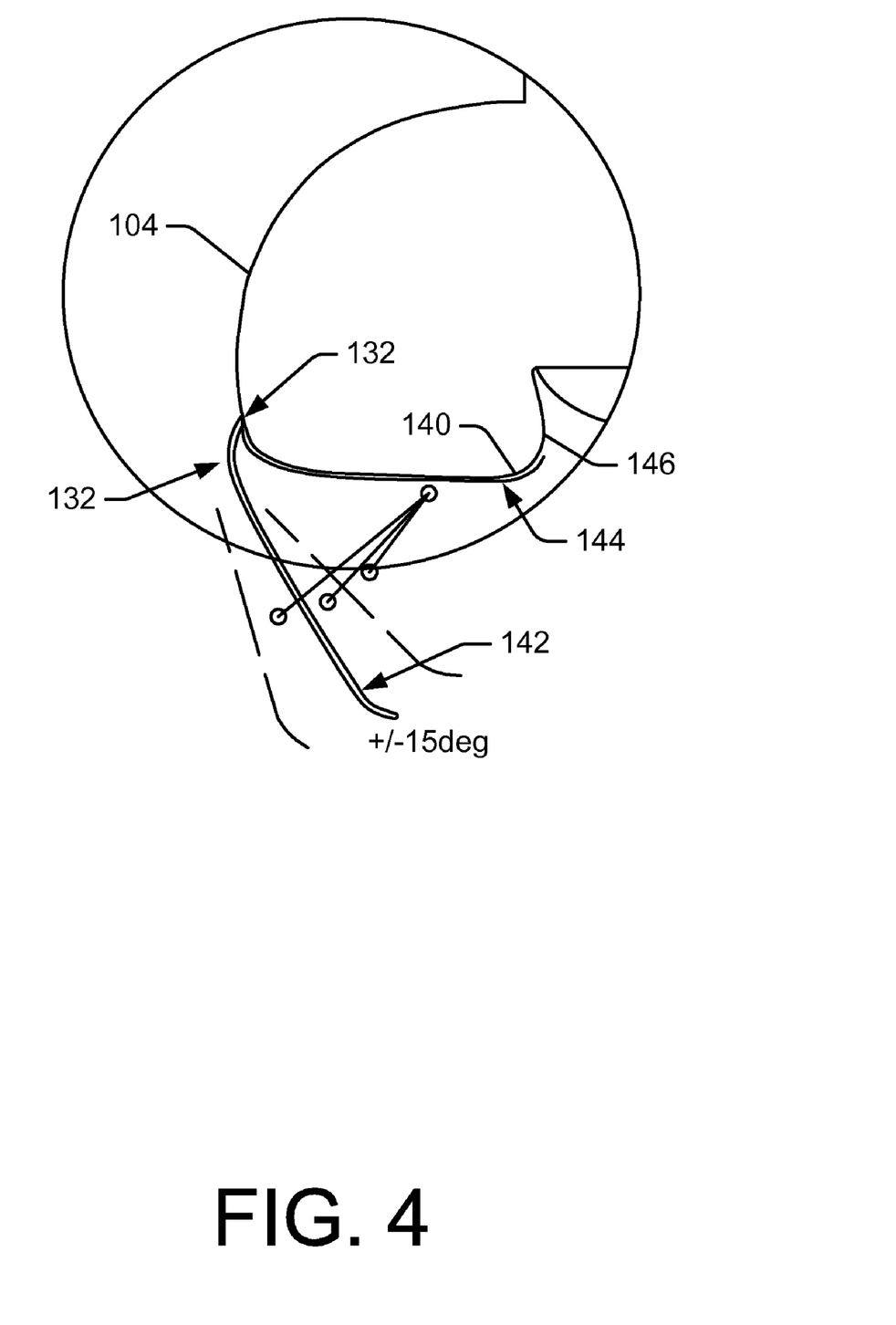
FIG. 4 is a fragmentary cross sectional view of an auxiliary fuel tank of the helicopter of FIG. 1 with the download alleviation device in various positions in accordance with alternate embodiments of the invention.

FIG. 4 is an enlarged cross-sectional view of the contoured strake 130 of FIG. 3. In this embodiment, the contoured strake 130 is pivotable between a plurality of deployed positions. In a particular embodiment, a nominal position 142 of the contoured strake 130 is approximately 70 degrees down from a stowed position 144, with variability of approximately +/−15 degrees from the nominal position 142. In the stowed position 144, the contoured strake 130 is configured to conform to a portion of the lower surface 140. As best shown in FIG. 4, in this embodiment, the contoured strake 130 is configured to extend all the way across the lower surface 140 of the auxiliary fuel tank 104 (from the outboard portion 132 to an inboard portion 146). In alternate embodiments, the size of the contoured strake 130 may be varied to cover greater or lesser portions of the lower surface 140 of the auxiliary fuel tank 104.

Embodiments of the present invention may provide significant advantages over the prior art. While not intending to be bound by theory, it is believed that the strakes positioned on the auxiliary fuel tanks may favorably impact the pressure distributions on the lower surfaces 140 of the auxiliary fuel tanks 104 (and on the fuselage 102), reducing the downloads caused by the downwash from the rotor assemblies 108. While not intending to be bound by theory, the introduction of a strake may cause movement of a low-pressure vortex away from lower surfaces 140 toward the strake or its tip. Also, a strake may change a width of a low-pressure wake to reduce drag. Thus, the helicopter 100 having the auxiliary fuel tanks 104 may achieve improved performance, including increased gross vehicle takeoff weight (increased payload capacity) in comparison with the prior art.

Wind tunnel testing has been conducted to verify the effectiveness of various download alleviation device configurations in accordance with the present invention. More specifically, a wind tunnel model of a representative portion 148 (delineated in FIG. 2) of the helicopter 100 was tested using various download alleviation device configurations. In these tests, the download alleviation devices extended along the entire length of the auxiliary fuel tanks 104 across the entire length of the representative portion 148. Of course, in alternate embodiments, the lengths of the download alleviation devices may be increased or decreased. Data from the wind tunnel tests of the representative portion 148 are briefly described below with reference to FIGS. 5 through 10.

Figure 5:
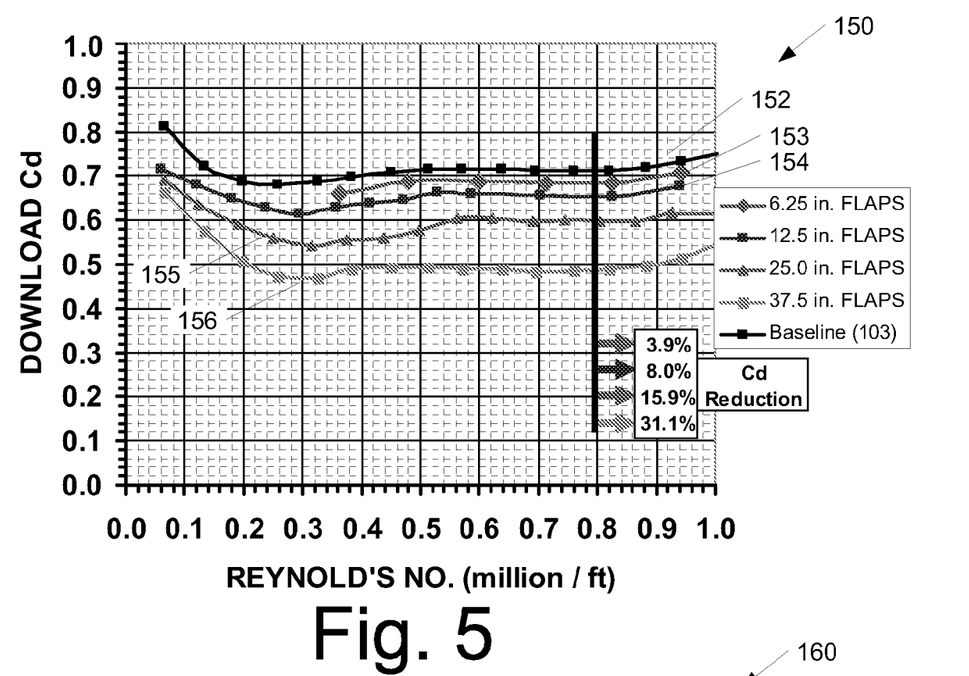
FIGS. 5 through 7 are graphs showing download drag coefficient versus Reynolds number for various download alleviation device configurations.
Figure 6:
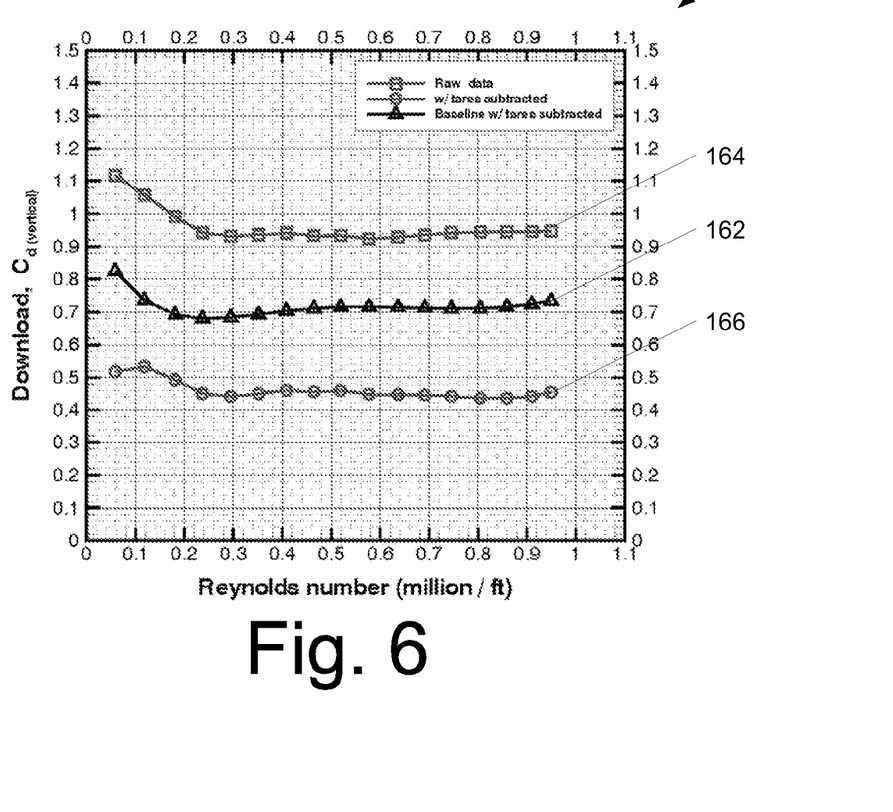
Figure 7:
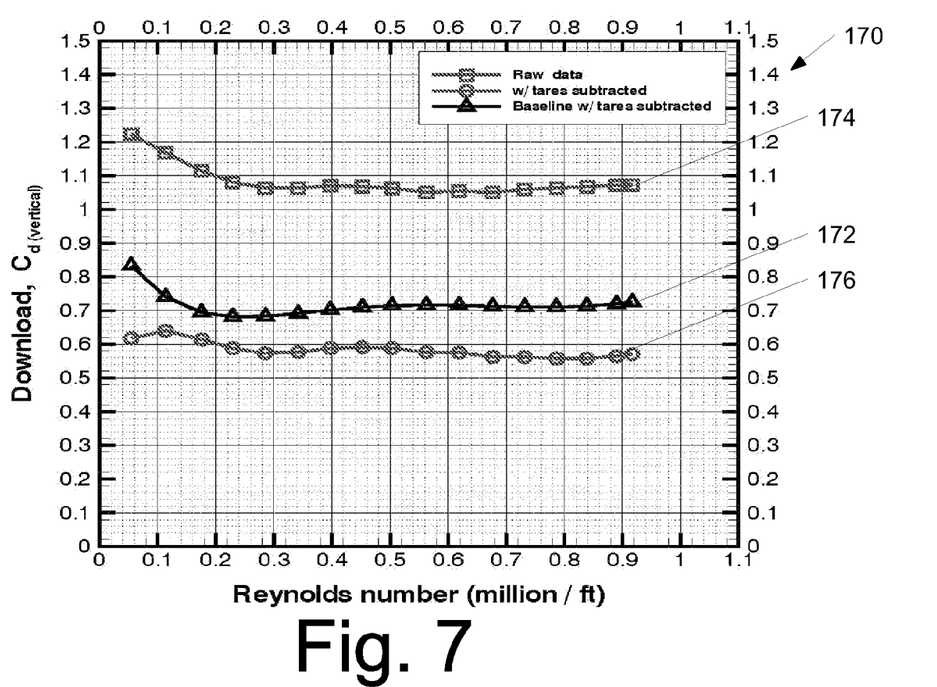

FIGS. 5 through 7 are graphs showing download drag coefficient versus Reynolds number for various download alleviation device configurations in accordance with embodiments of the present invention. More specifically, as shown in FIG. 5, a graph 150 of download drag coefficient versus Reynolds number includes a first dataset 152 for a baseline configuration without any download alleviation devices. A second dataset 153 shows the drag coefficient for a non-conformal (or planar) strake coupled to the outboard portion 112 of the auxiliary fuel tank 104, positioned at zero degrees of deflection (i.e. vertical), and having a width w (see FIG. 3) of 6.25 inches. Similarly, third, fourth, and fifth datasets 154, 155, 156 show the drag coefficient for strakes having a width w of 12.5 inches, 25.0 inches, and 37.5 inches, respectively. Generally, the datasets shown in FIG. 5 demonstrate that the non-conformal strakes tend to reduce drag coefficient (i.e. download) in comparison with the baseline configuration, and that drag coefficients continue to decrease as the width w of the non-conformal strake is increased.

Similarly, FIG. 6 shows a graph 160 of download drag coefficient versus Reynolds number, and includes a first dataset 162 for a baseline configuration without any download alleviation devices. A second dataset 164 shows an uncorrected (raw data) drag coefficient for a non-conformal (or planar) strake coupled to the outboard portion 112 of the auxiliary fuel tank 104, having a width w of 42 inches, and a deflection angle of 5 degrees inboard from vertical. A third dataset 166 shows a corrected drag coefficient for the same non-conformal strake (planar, width w of 42 inches, deflection angle of 5 degrees). Comparison of the first and third datasets 162, 166 clearly shows that download drag coefficient is substantially reduced by the download alleviation device over the range of Reynolds numbers investigated.

FIG. 7 shows a graph 170 of download drag coefficient versus Reynolds number, and includes a first dataset 172 for a baseline configuration without any download alleviation devices. A second dataset 174 shows an uncorrected (raw data) drag coefficient for a non-conformal (or planar) strake coupled to the outboard portion 112 and having a width w of 10 inches and a deflection angle of 10 degrees. A third dataset 176 shows a corrected drag coefficient for the same non-conformal strake (planar, width w of 10 inches, deflection angle of 10 degrees). Again, these data show that download drag coefficient is substantially reduced by the download alleviation device.

Figure 8:
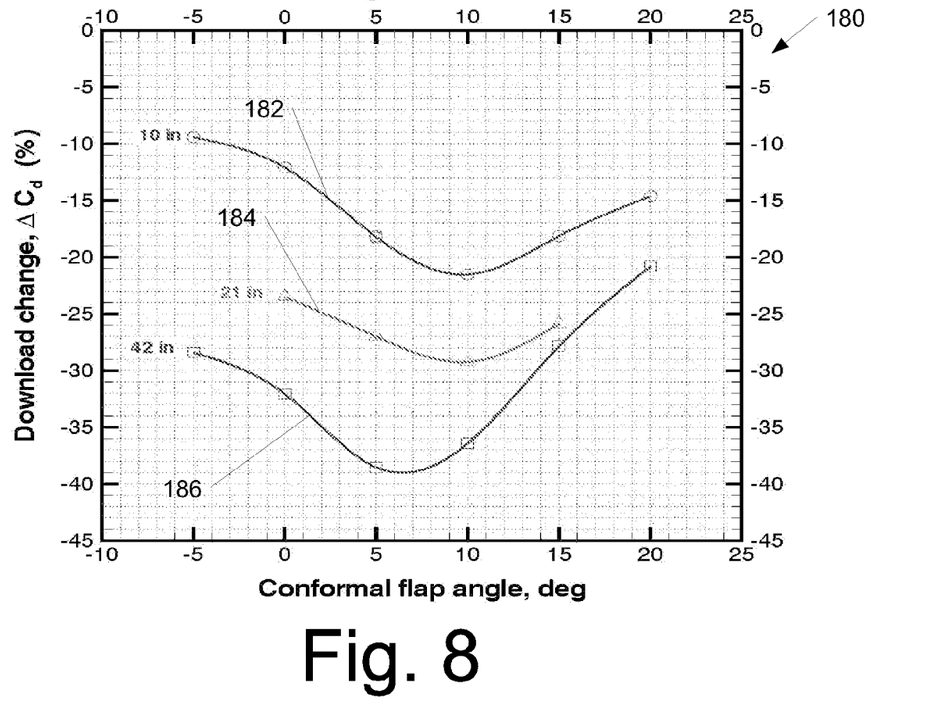
FIGS. 8 and 9 show graphs of percentage of reduction of download drag coefficient versus strake deflection angle for various download alleviation device configurations.
Figure 9:
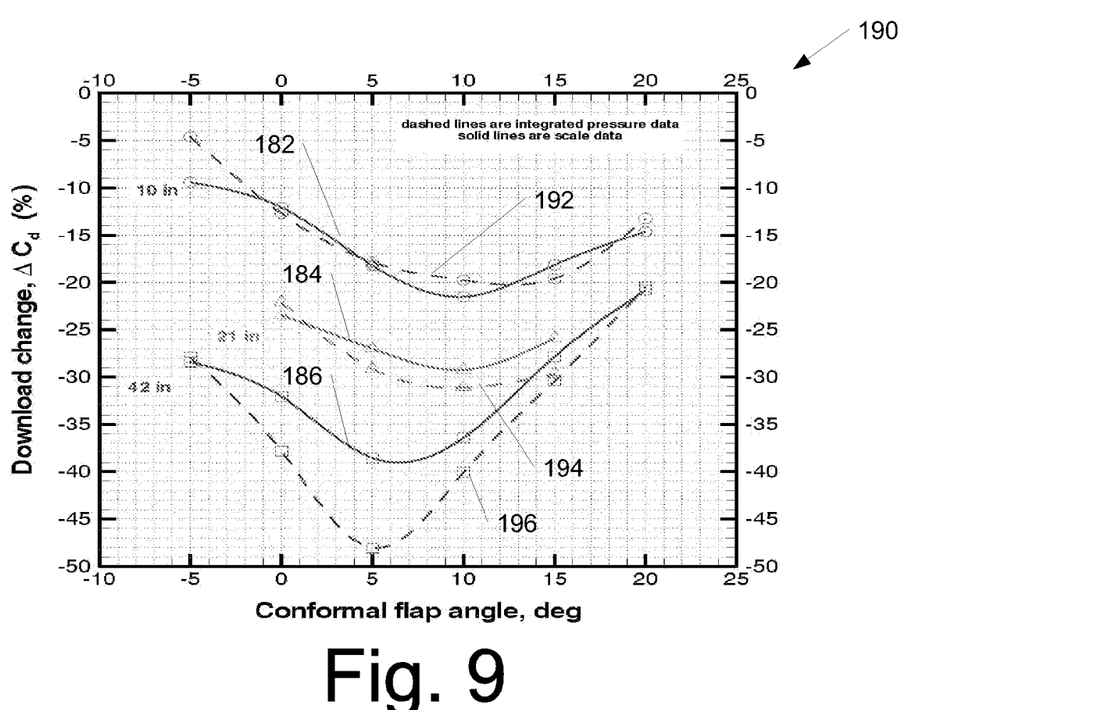

FIG. 8 displays a graph 180 showing a percentage of reduction of download drag coefficient versus strake deflection angle for various download alleviation device configurations. More specifically, a first dataset 182 shows the percentage change of download drag coefficient for a conformal (or non-planar) strake having width w of 10 inches. Second and third datasets 184, 186 show the percentage change of download drag coefficient for conformal strakes having widths w of 21 inches and 42 inches, respectively. The first, second, and third datasets 182, 184, 186 are derived from integrated pressure data obtained during the wind tunnel tests. For comparison purposes, FIG. 9 shows a graph 190 of percentage of reduction of download drag coefficient versus strake deflection angle (from vertical) for the same three strake configurations (widths w of 10 inches, 21 inches, and 42 inches), wherein fourth, fifth, and sixth datasets 192, 194, 196 are derived from scale (or balance) data. Generally, the datasets shown in FIGS. 8 and 9 demonstrate that download drag coefficient is reduced by the conformal strakes for all deflection angles investigated, and the amount of reduction of the download drag coefficient increases with increasing strake width w.

Figure 10:
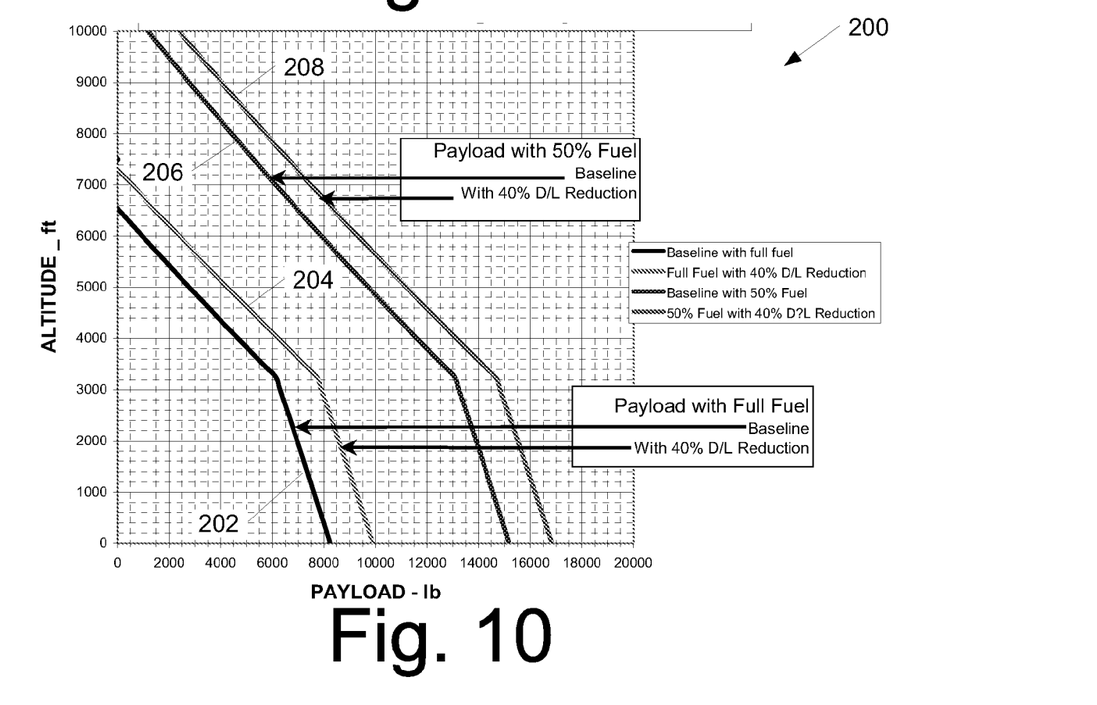
FIG. 10 is a graph showing altitude versus payload for various download alleviation device configurations in accordance with alternate embodiments of the invention.

FIG. 10 is a graph 200 showing altitude versus payload for helicopters having various download alleviation device configurations in accordance with alternate embodiments of the invention. More specifically, a first dataset 202 shows altitude as a function of payload for a baseline helicopter having a full load of fuel and no download alleviation devices. A second dataset 204 shows the increase in payload for the helicopter having a full load of fuel and assuming a 40% reduction in download drag afforded by one or more embodiments of download alleviation devices in accordance with the present invention. Similarly, a third dataset 206 shows altitude as a function of payload for a baseline helicopter having a half load of fuel and no download alleviation devices, while a fourth dataset 208 shows the increase in payload as a function of altitude for the helicopter having a half load of fuel and assuming a 40% reduction in download drag. The data shown in FIG. 10 demonstrate the advantages in payload capacity that may be achieved using download alleviation devices in accordance with embodiments of the present invention.

For an embodiment with pivotable strakes, takeoff can be initiated with the strakes in a retracted position as the aircraft is in ground effects. The strakes may then be deployed after the aircraft reaches a minimum height where they improve performance. The strakes may be retracted again during forward flight to reduce drag.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A rotary aircraft, comprising:
   an airframe assembly including a fuselage;
   at least one rotor assembly operatively coupled to the airframe assembly and configured to provide a downwash over at least a portion of the airframe assembly during operation of the at least one rotor assembly;
   a fuel tank coupled to the fuselage, the fuel tank projecting at least partially laterally outwardly beyond a plan view perimeter of the fuselage; and
   a first controllably pivotable download alleviation strake, the first download alleviation strake coupled to an outboard portion of the fuselage and extending at least partially along a length of the fuselage, wherein the first download alleviation strake is coupled to the fuselage via the fuel tank and extends substantially an entire length of the fuel tank.

2. The rotary aircraft of claim 1, further comprising a controllably pivotable second download alleviation strake, the second download alleviation strake coupled to a centerline portion of the fuselage.

3. The rotary aircraft of claim 1, wherein the first download alleviation strake is pivotable between an outwardly deployed position and an inwardly deployed position.

4. The rotary aircraft of claim 1, wherein the first download alleviation strake is contoured to include a first arcute portion, an approximately planar portion, and a second arcute portion, such that the first download alleviation strake at least partially conforms to a lower surface portion of the fuel tank when in an inwardly deployed.

5. The rotary aircraft of claim 1, wherein the first download alleviation strake is contoured to at least partially conform to an adjacent lower surface portion of the fuel tank, and wherein the first download alleviation strake has a nominal position of approximately 70 decrees from a stowed position.

6. The rotary aircraft of claim 5, wherein the first download alleviation strake is pivotably rotatable approximately ±45 degrees from the nominal position.

7. The rotary aircraft of claim 6, wherein the first download alleviation strake is configured to extend across an entire lower surface portion of the fuel tank.

* * * * *